Figure 1:
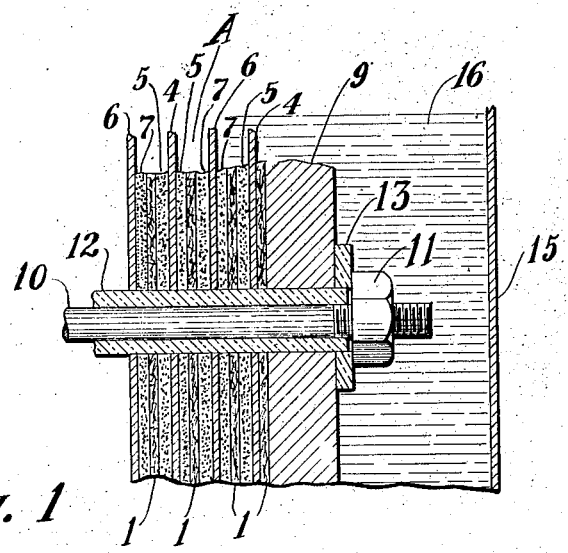

Nov. 3, 1925.

T. A. EDISON 1,559,562

STORAGE BATTERY

Filed May 25, 1923

INVENTOR
Thomas A. Edison
BY Henry Lanahan
ATTORNEY

Patented Nov. 3, 1925.

1,559,562

UNITED STATES PATENT OFFICE.

THOMAS A. EDISON, OF WEST ORANGE, NEW JERSEY.

STORAGE BATTERY.

Application filed May 25, 1923. Serial No. 641,368.

*To all whom it may concern:*

Be it known that I, THOMAS A. EDISON, a citizen of the United States, and a resident of Llewellyn Park, West Orange, Essex County, New Jersey, have invented certain new and useful Improvements in Storage Batteries, of which the following is a description.

My invention relates to storage batteries and more particularly to the means for separating and insulating the electrode elements of storage battery cells, and also to the method of producing and treating said means.

The invention is especially directed to asbestos insulating sheets employed for separating the electrode elements of a battery pile wherein the electrode elements and insulating separating sheets are subjected to and maintained under great pressure as, for example, in the type of cell disclosed in Patent No. 1,377,194, granted to me on May 10, 1921.

In some aspects the present invention is an improvement on that disclosed in my copending application, Serial No. 638,694, filed May 14, 1923, and entitled Storage batteries.

The principal object of my invention is to produce insulating separators, preferably from ordinary commercial asbestos paper, which when subjected to great pressure as, for example, in cells of the type disclosed in my patent referred to above, will have a sufficiently high porosity to permit such ready passage of the electrolyte of the cells therethrough as to ensure a sufficient circulation of such electrolyte in the operation of the cells.

The battery pile of a cell of the type disclosed in my Patent No. 1,377,194 comprises a series of very thin conductive sheets, preferably of nickel, separated by thin insulating sheets of asbestos paper with thin layers of finely divided active material respectively disposed between the surfaces of each of the thin nickel sheets and the adjacent asbestos sheets, the whole being held together and maintained under great pressure with the layers of active material in firm, close surface contact with the respective nickel sheets. The layers of active material for the negative elements preferably consist of electrolytically finely divided iron or oxide of iron, preferably mixed with a small amount of mercury, and the layers of active material for the positive elements preferably consist of finely divided nickel hydroxide. Where the insulating sheets employed in cells of this character are formed of ordinary untreated commercial asbestos paper, the capacity of such cells at high discharge rates is considerably below that which should be obtained, and moreover the capacity decreases to some extent with the length of time the cells are in use. This I believe to be due to the fact that the asbestos sheets are so compressed by the great pressure to which the same are subjected and under which they are maintained, that the porosity of the sheets is greatly reduced or, in other words, said sheets are rendered more impervious to the passage of the electrolyte. Consequently, the circulation of the electrolyte is impaired to such an extent as to effect a material increase in the internal resistance of the cells. I have found that greatly improved results may be obtained by employing in a cell of the character described, insulating separating sheets formed of ordinary commercial asbestos paper which has been impregnated with any of a number of soluble substances, preferably with an amount thereof sufficient to fill or substantially fill the pores of the impressed paper, the said substance being subsequently eliminated from the sheets preferably after subjecting the assembled battery pile to the pressure under which it is maintained when in use.

To obtain the desired results, I preferably proceed as follows: Ordinary commercial asbestos paper is first impregnated with a soluble alkaline substance such as carbonate of soda or potash, but preferably with carbonate of soda. This is preferably effected by soaking the paper with a solution of such salt until the paper takes up a sufficient amount of the solution so that when the paper is subsequently dried the soluble salt content thereof will be approximately 10% of the bulk of the asbestos. The paper is then dried and cut into separator sheets of the desired size. Where these sheets are to be used in a cell of the type disclosed in my patent referred to above, they are coated on one face with a thin layer of finely divided metallic iron and on the opposite face with a thin layer of finely divided nickel hydroxide, are individually placed between steel dies and subjected to a pressure of several thousand pounds per square inch, after which they are assembled into a battery pile such as described above. This battery pile is subjected to a high pressure in a hydraulic press, and while held under pressure therein the elements of the pile are secured rigidly together as by means of bolts and nuts. Accordingly, upon removing the battery pile from the press, the elements thereof will be held together and maintained under a high pressure with the entire surface of each layer of active material in close, firm contact with the adjacent thin sheet of nickel or other conductive material. At this point the insulating sheets will by reason of the introduction of the soluble salt referred to are very impervious to the passage of liquid therethrough. All or nearly all of the soluble salt referred to, however, is now eliminated from the separator sheets, preferably by immersing the pile in a liquid in which the salt is soluble. Where carbonate of soda or other soluble salt is employed, the same is eliminated by immersing the assembled battery pile in water preferably containing about 3% of caustic soda so as to prevent corrosion of any of the steel parts of the assembly. The battery pile is left in the water until practically all of the carbonate of soda or other soluble salt is dissolved or percolates out, this usually requiring about 48 hours, during which time the water or solution is changed several times. The asbestos separator sheets will then have a porosity which is directly dependent upon the amount of the soluble salt originally introduced into the asbestos paper. For example, where the amount of soluble salt introduced into the asbestos paper is such that the latter when dry contains substantially 10% by bulk of the salt, the insulating separators will after such salt is dissolved out, have a substantially 10% porosity. The battery pile is now removed from the water or other liquid in which the same was immersed to dissolve the soluble salt, disposed in a cell container, and the cell completed in the usual manner. The porosity of the asbestos insulating separators treated as described, is sufficient to permit of a fairly rapid and sufficient circulation of the electrolyte of the cell in which the pile is used, with the result that the resistance of the battery pile is materially reduced and undue heating is accordingly prevented.

In order that my invention may be more clearly understood, attention is directed to the drawing accompanying and forming a part of this specification and in which:—

Figure 2:
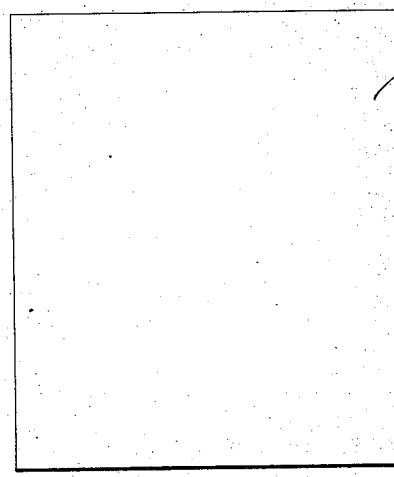

Figure 1 is an enlarged fragmental, sectional view of a storage battery cell of the type disclosed in my Patent No. 1,377,194 referred to above; and Figure 2 is a plan view of one of the asbestos insulating sheets for the cell shown in Figure 1.

Referring to the drawing, reference character 1 represents one of the asbestos separator sheets produced as described above, prior to the assembly thereof into a battery pile and prior to the elimination of the carbonate of soda or other soluble salt. Each of a plurality of these sheets is coated on one side or face with electrolytically active finely divided iron and on the opposite side or face with finely divided nickel hydroxide. The coated sheets are then subjected to a pressure of several thousand pounds per square inch after which the same together with a plurality of thin conductive sheets preferably formed of nickel, are assembled into a battery pile A (see Fig. 2). The battery pile A comprises a plurality of superposed and alternately arranged negative and positive electrode elements, each of the negative elements consisting of a very thin conductive sheet or foil 4, preferably of nickel, and two thin layers 5 of the electrolytically active finely divided iron respectively disposed on opposite sides of the sheet or foil 4, and each of the positive elements consisting of a thin conductive sheet or foil 6 similar to the sheets or foils 4 of the negative elements, and two thin layers 7 of the powdered nickel hydroxide respectively disposed on opposite sides of the sheet or foil 6 and in contact therewith. The insulating sheets 1 are rspectively disposed between the negative and positive elements, and each of these sheets is, of course, coated on one side with the layer 5 of the finely divided iron 6 in contact with the adjacent thin nickel sheet or foil 4 and on its other side with the layer 7 of the nickel hydroxide which is in contact with the adjacent nickel sheet or foil 6. Strong, heavy nickel plated pressure plates are respectively disposed at the sides of the superposed negative and positive elements in contact therewith, only one of these plates, indicated by reference character 9, being shown. The conductive sheet or foil 4 of each of the outermost negative elements is not in contact at its outer surface with a layer of finely divided iron but is merely separated and insulated from the adjacent pressure plate by an uncoated insulating sheet 1. Reference character 10 represents one of a plurality of rods which extend through the battery pile and pressure plates to hold the pile assembled. The rod 10 at one end, extends outwardly beyond the adjacent pressure plate 9 and has a nut 11 threaded thereon. The pile A is subjected to pressure and the elements thereof then secured together so as to be maintained under pressure with the layers of active material in firm, intimate and uninterrupted surface contact with the respective adjacent nickel sheets 4 and 6, as hereinbefore described. Each rod 10 extends through a sleeve 10 of hard rubber or other suitable non-conducting material which is disposed in and closely fits openings provided for the rod in the assembled elements of the pile. the nut 11 on each rod 10 is suitably insulated from the adjacent pressure plate 9 as by means of a washer 13 formed of hard rubber or other suitable non-conducting material.

The pile A is now immersed in water, preferably containing about 3% of caustic soda, and allowed to remain therein until all or practically all of the carbonate of soda or other soluble salt in the insulating sheets 1 dissolves or percolates out. The battery pile is then removed from the water, disposed in the cell container 15 and the cell completed.

While I prefer to employ finely divided iron and nickel hydroxide as the active materials of the cells, where the latter are of the Edison type, other suitable active materials may be employed. For example, in place of finely divided iron as the active material for the negative elements, finely divided cadmium or cobalt may be employed, as disclosed respectively in my Patents Nos. 692,507, dated Feb. 4, 1902, and 721,682, dated March 3, 1903; and in place of the nickel hydroxide as the active material for the positive elements, an oxide of cobalt may be employed, as disclosed in my Patent No. 704,304, dated July 8, 1902.

Having now described my invention, what I claim as new and desire to protect by Letters Patent, is as follows:

1. Means for separating the electrode elements of storage battery cells comprising a member formed of asbestos and containing a carbonate adapted to be subsequently eliminated to thereby increase the porosity of the member, substantially as described.

2. Means for separating the electrode elements of storage battery cells comprising a member formed of asbestos and containing carbonate of soda adapted to be subsequently eliminated to thereby increase the porosity of the member, substantially as described.

3. Means for separating the electrode elements of storage battery cells comprising commercial asbestos paper impregnated with a substance adapted to be subsequently eliminated to thereby increase the porosity of the paper, substantially as described.

4. Means for separating the electrode elements of storage battery cells comprising commercial asbestos paper impregnated with a substance adapted to be subsequently eliminated, the said substance present in the paper being approximately 10% by bulk of the asbestos, substantially as described.

5. Means for separating the electrode elements of storage battery cells comprising commercial asbestos paper impregnated with a soluble carbonate adapted to be subsequently eliminated to thereby increase the porosity of the paper, substantially as described.

6. Means for separating the electrode elements of storage battery cells comprising commercial asbestos paper impregnated with carbonate of soda adapted to be subsequently eliminated to thereby increase the porosity of the paper, substantially as described.

7. Means for separating the electrode elements of storage battery cells comprising asbestos paper impregnated with a soluble carbonate adapted to be subsequently eliminated, the said carbonate present in the paper being approximately 10% by bulk of the asbestos, substantially as described.

8. Means for separating the electrode elements of storage battery cells comprising asbestos paper impregnated with carbonate of soda adapted to be subsequently eliminated, the carbonate of soda present in the paper being approximately 10% by bulk of the asbestos, substantially as described.

This specification signed this 23d day of May 1913.

THOS. A. EDISON.